(12) United States Patent
Frazer

(10) Patent No.: US 7,107,425 B2
(45) Date of Patent: Sep. 12, 2006

(54) SDRAM CONTROLLER THAT IMPROVES PERFORMANCE FOR IMAGING APPLICATIONS

(75) Inventor: David A. Frazer, Irvine, CA (US)

(73) Assignee: Match Lab, Inc., Irvine, CA (US)

( * ) Notice: Subject to any disclaimer, the term of this patent is extended or adjusted under 35 U.S.C. 154(b) by 541 days.

(21) Appl. No.: 10/656,609

(22) Filed: Sep. 6, 2003

(65) Prior Publication Data

US 2005/0055349 A1    Mar. 10, 2005

(51) Int. Cl.
*G06F 12/02* (2006.01)

(52) U.S. Cl. .................................... 711/169

(58) Field of Classification Search ............ 711/105, 711/169; 365/185.12
See application file for complete search history.

(56) References Cited

U.S. PATENT DOCUMENTS

| | | | |
|---|---|---|---|
| 4,937,791 A * | 6/1990 | Steele et al. ........... | 365/230.03 |
| 5,889,714 A * | 3/1999 | Schumann et al. ......... | 365/203 |
| 6,052,134 A * | 4/2000 | Foster ....................... | 345/533 |
| 6,286,075 B1 * | 9/2001 | Stracovsky et al. ........... | 711/5 |
| 6,442,645 B1 * | 8/2002 | Freker ........................ | 711/105 |
| 6,535,966 B1 * | 3/2003 | Cherabuddi et al. ........ | 711/154 |
| 2004/0236889 A1 * | 11/2004 | Kim .......................... | 710/113 |

* cited by examiner

*Primary Examiner*—Kevin L. Ellis
(74) *Attorney, Agent, or Firm*—Charles C. H. Wu; Wu & Cheung, LLP

(57) ABSTRACT

A method and apparatus for efficient access to multiple lines of image data using a memory device with at least one memory module, wherein each memory module has at least one bank with multiple rows. The method includes the step of maintaining address information of a current row for each bank within each memory module. Next, the method receives a request for an incoming row. Finally, the method determines if the incoming row matches the current row based on the address information and if so, immediately accesses the current row without closing and reopening the current row.

10 Claims, 4 Drawing Sheets

| | Row/Col | 32 cols | 32 cols | 32 cols | 32 cols | 32 cols | 32 cols | 32 cols | 32 cols | 32 cols | 32 cols | 32 cols | 32 cols | 32 cols | 32 cols | 32 cols | 32 cols |
|---|---|---|---|---|---|---|---|---|---|---|---|---|---|---|---|---|---|
| Bank 0 | 0 | 0 | 1 | 2 | 3 | 4 | 5 | 6 | 7 | 8 | 9 | 10 | 11 | 12 | 13 | 14 | 15 |
| | 1 | 0 | 1 | 2 | 3 | 4 | 5 | 6 | 7 | 8 | 9 | 10 | 11 | 12 | 13 | 14 | 15 |
| | N | 32 | 33 | 34 | 35 | 36 | 37 | 38 | 39 | 40 | 41 | 42 | 43 | 44 | 45 | 46 | 47 |
| | N+1 | 32 | 33 | 34 | 35 | 36 | 37 | 38 | 39 | 40 | 41 | 42 | 43 | 44 | 45 | 46 | 47 |
| | | | | | | | | | | | | | | | | | |
| | | | | | | | | | | | | | | | | | |
| | 1K-1 | | | | | | | | | | | | | | | | |
| Bank 1 | 0 | 16 | 17 | 18 | 19 | 20 | 21 | 22 | 23 | 24 | 25 | 26 | 27 | 28 | 29 | 30 | 31 |
| | 1 | 16 | 17 | 18 | 19 | 20 | 21 | 22 | 23 | 24 | 25 | 26 | 27 | 28 | 29 | 30 | 31 |
| | N | 48 | 49 | 50 | 51 | 52 | 53 | 54 | 55 | 56 | 57 | 58 | 59 | 60 | 61 | 62 | 63 |
| | N+1 | 48 | 49 | 50 | 51 | 52 | 53 | 54 | 55 | 56 | 57 | 58 | 59 | 60 | 61 | 62 | 63 |
| | | | | | | | | | | | | | | | | | |
| | | | | | | | | | | | | | | | | | |
| | 1K-1 | | | | | | | | | | | | | | | | |
| Bank 2 | 0 | | | | | | | | | | | | | | | | |
| | 1 | | | | | | | | | | | | | | | | |
| | 2 | | | | | | | | | | | | | | | | |
| | | | | | | Reserved for other memory buffers and functions. | | | | | | | | | | | |
| | n-1 | | | | | | | | | | | | | | | | |
| | 1K-1 | | | | | | | | | | | | | | | | |
| Bank 3 | 0 | | | | | | | | | | | | | | | | |
| | 1 | | | | | | | | | | | | | | | | |
| | 2 | | | | | | | | | | | | | | | | |
| | | | | | | Reserved for other memory buffers and functions. | | | | | | | | | | | |
| | n-1 | | | | | | | | | | | | | | | | |
| | 1K-1 | | | | | | | | | | | | | | | | |

*FIG. 2*

| Addresses [row/col] | Ras/ Cas | Bank Addr | A12 | A11 | A10 | A9 | A8 | A7 | A6 | A5 | A4 | A3 | A2 | A1 | A0 |
|---|---|---|---|---|---|---|---|---|---|---|---|---|---|---|---|
| 12/8 | Ras | 21,19 | | A24 | A23 | A22 | A20 | | | | | | | | |
| | Cas | | | | AP | | | | | A[18-3] Depends on Pitch | | | | | |
| 12/9 | Ras | 21,19 | | A24 | A23 | A22 | A20 | | | | | | | | |
| | Cas | | | | AP | | A25 | | | See FIG. 5 | | | | | |
| 13/9 | Ras | 21,19 | A26 | A24 | A23 | A22 | A20 | | | | | | | | |
| | Cas | | | | AP | | A25 | | | | | | | | |
| 12/10 | Ras | 21,19 | | A24 | A23 | A22 | A20 | | | | | | | | |
| | Cas | | | | AP | A26 | A25 | | | | | | | | |
| 13/10 | Ras | 21,19 | A27 | A24 | A23 | A22 | A20 | | | | | | | | |
| | Cas | | | | AP | A26 | A25 | | | | | | | | |
| 13/11 | Ras | 21,19 | A27 | A24 | A23 | A22 | A20 | | | | | | | | |
| | Cas | | | A28 | AP | A26 | A25 | | | | | | | | |

*FIG. 4*

| Pitch [KB] | Image Lines Visible pre Row | Row/ Col | A7 | A6 | A5 | A4 | A3 | A2 | A1 | A0 |
|---|---|---|---|---|---|---|---|---|---|---|
| 1/2 | 32 | Row | A18 | A17 | A16 | A15 | A14 | A8 | A7 | A6 |
| | | Col | A13 | A12 | A11 | A10 | A9 | A5 | A4 | A3 |
| 1 | 32 | Row | A18 | A17 | A16 | A15 | A9 | A8 | A7 | A6 |
| | | Col | A14 | A13 | A12 | A11 | A10 | A5 | A4 | A3 |
| 2 | 32 | Row | A18 | A17 | A16 | A10 | A9 | A8 | A7 | A6 |
| | | Col | A15 | A14 | A13 | A12 | A11 | A5 | A4 | A3 |
| 4 | 8 | Row | A18 | A17 | A16 | A15 | A11 | A10 | A9 | A8 |
| | | Col | A14 | A13 | A12 | A7 | A6 | A5 | A4 | A3 |
| 8 | 8 | Row | A18 | A17 | A16 | A12 | A11 | A10 | A9 | A8 |
| | | Col | A15 | A14 | A13 | A7 | A6 | A5 | A4 | A3 |
| 16 | 8 | Row | A18 | A17 | A13 | A12 | A11 | A10 | A9 | A8 |
| | | Col | A16 | A15 | A14 | A7 | A6 | A5 | A4 | A3 |
| 32 | 8 | Row | A18 | A14 | A13 | A12 | A11 | A10 | A9 | A8 |
| | | Col | A17 | A16 | A15 | A7 | A6 | A5 | A4 | A3 |
| 64 | 8 | Row | A15 | A14 | A13 | A12 | A11 | A10 | A9 | A8 |
| | | Col | A18 | A17 | A16 | A7 | A6 | A5 | A4 | A3 |

*FIG. 5*

SDRAM CONTROLLER THAT IMPROVES PERFORMANCE FOR IMAGING APPLICATIONS

BACKGROUND OF THE INVENTION

1. Field of the Invention

The invention relates in general to image processing. More particularly, this invention relates to a method and apparatus for improving the performance of an SDRAM-based memory buffer in imaging applications that require efficient access to multiple lines of an image bitmap.

2. Description of the Related Art

Image processing algorithms frequently modify pixels within an image to effect some desired improvement or to detect some characteristics of the image. Most of these algorithms are based on the nearest neighbors of each particular pixel, requiring calculations for several lines of the image data. Access to neighboring pixels on multiple lines of the image can be slower when the image is stored in dynamic random access memory (DRAM) or synchronous dynamic random access memory (SDRAM) due to the functional characteristics of the memory devices. For DRAM and SDRAM, pixel data in a common row in memory can be accessed very efficiently, but accessing pixel elements in other rows can be quite inefficient.

DRAM devices support a "page mode" operation whereby, once a particular row of the memory array is accessed, subsequent accesses to the same "open" row can be immediate. However, accesses to pixel data in other rows of the memory array require that the current row be "closed" and the new one "opened" before actual data access cycles can take place. SDRAM devices typically have four separate internal memory arrays, each of which may have a current open row. This improves performance in that four regions of memory can be accessed efficiently without opening and closing rows. For example, if an image processing algorithm required access to four lines of the image data, and each of those lines resided in a different memory array, then efficient access is possible. Unfortunately, many algorithms will require access to a greater number of lines of the image, so some of the accesses will require opening and closing a row for each pixel read or write.

In environments where more lines must be accessed than there are separate memory arrays available, and the controlling device must open and close rows of the array for some accesses, the controlling device must either: a) open and close each row for every access; or b) be knowledgeable of which rows must be opened and closed in which memory array based on the address of the target data.

For these reasons, many image processing hardware implementations are based on static random access memory, either within an ASIC device or based on external SRAM devices. The SRAM devices are efficient due to the non-multiplexed nature of their address bus, but are more expensive, less dense and reduced in capacity. Image processing hardware implementations that operate on large, high-resolution images and implement algorithms based on many lines of the image are severely restricted by the smaller capacity of the SRAM devices. These implementations either hold only a small portion of the image in SRAM memory, or are very costly when large amounts of SRAM are implemented. The more cost effective, dense DRAM or SDRAM devices lack only in the bandwidth available due to the overhead cycles required to open and close rows of the arrays while accessing multiple lines of the image (for these types of nearest-neighbor algorithms).

In U.S. Pat. No. 6,286,075, Stracovsky discloses a method of speeding up access to a memory page using a number of M page tag registers to track a state of physical pages in a memory device having N memory banks where N is greater than M. However, Stracovsky does not address the improvements that can be achieved when sophisticated controller structures and features are complemented with dynamic addressing schemes that improve the probability that a desired set of items will be located within a single page of memory.

SUMMARY OF THE INVENTION

Accordingly, one object of the present invention is to provide a memory controller for image processing that is cognizant of open rows, thus eliminating the redundant opening and closing of particular rows.

A second object of the invention is to provide a memory controller for image processing that allows for simultaneous efficient access to many lines of the image memory, thus enhancing usability in nearest-neighbor algorithms.

A third object of the invention is to provide a memory controller for image processing with a multiplexing scheme for dynamically changing and optimizing access to different data types in different regions of the memory.

To achieve these and other advantages and in accordance with the purpose of the invention, as embodied and broadly described herein, the invention provides a method and apparatus for efficient access to multiple lines of image data using a memory device with at least one memory module, wherein each memory module has at least one bank with multiple rows. The method includes the step of maintaining address information of a current row for each bank within each memory module. Next, the method receives a request for an incoming row. Finally, the method determines if the incoming row matches the current row based on the address information and if so, immediately accesses the current row without closing and reopening the current row.

BRIEF DESCRIPTION OF THE DRAWINGS

FIG. 2 is a table depicting the memory configuration of an SDRAM device in accordance with the present invention.

FIG. 4 is a table illustrating dynamic addresses multiplexing in accordance with the present invention.

FIG. 5 is a table that complements FIG. 4 to illustrate dynamic addresses multiplexing in accordance with the present invention.

DESCRIPTION OF THE PREFERRED EMBODIMENTS

Before proceeding with a description of the drawings, a brief discussion of configuring DRAM and SDRAM memory in accordance with the present invention may be helpful. For DRAM and SDRAM devices, controlling and organizing the image data locations in memory is imperative for efficient accesses. The devices must make sure that adjacent lines of the image data will reside in different memory banks, thus requiring proper address multiplexing schemes. For example, if an image uses 8 bits of memory to represent the value of each pixel element, the image is 1500 pixels wide, and a row of each memory array could support 2048 pixels, then image lines would be stored on 2048 byte boundaries to ensure that adjacent lines resided in different banks of the memory array in a predictable manner. In fact, the bank selection decoding would be implemented so that line n of an image resided in bank 0, and line n+1 resided in bank 1, etc. The number of lines would equal the number of banks of the SDRAM device. An extension of this concept allows multiple strips of lines of the image to reside in each row, with the strips being horizontal, but not complete lines. In this manner, many more image lines may be efficiently accessed in each memory row, and each image line would occupy several different rows of the image memory.

Figure 1:
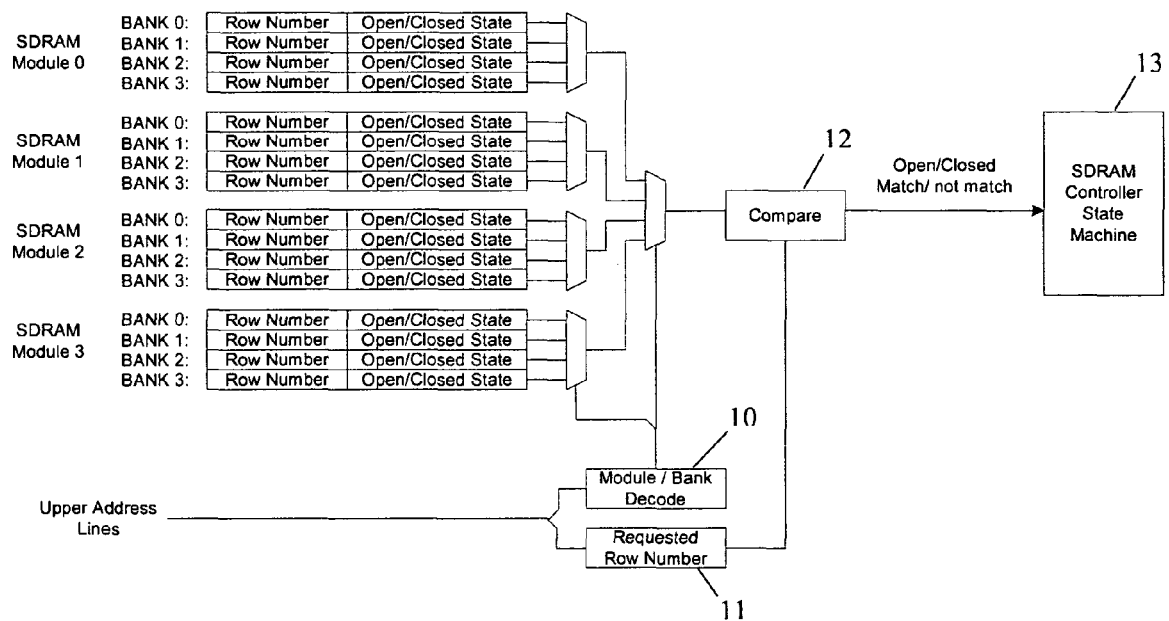
FIG. 1 is a diagram illustrating the computer hardware within the SDRAM controller that maintains the state of each bank in accordance with the present invention.

Referring now to FIG. 1, a diagram illustrating the computer hardware within the SDRAM controller that maintains the state of each bank in accordance with the present invention is shown. Based on upper memory addresses, SDRAM controller state machine 13 receives the open/closed row status of a given bank and the current row. This information is provided by bank decode module 10 and row number module 11. If compare module 12 indicates the incoming requested row matches the currently open row, then it is not necessary for the SDRAM controller to close the row and re-open it, and the operation proceeds immediately. In this example, the SDRAM controller supports four SDRAM modules, labeled 0 thru 3.

Still referring to FIG. 1, the SDRAM controller maintains a copy of the current row address for each bank of SDRAM. Because each of the SDRAM modules 0 thru 3 have four internal banks, a total of sixteen registers are available to hold current row values. Each row is capable of storing multiple lines of the image as discussed later. For each bank, there is an "open" bit that indicates the current row is open and available for access. When a row is activated by SDRAM controller state machine 13, the row to be accessed is stored in the appropriate register for the module and bank being accessed, and the "open" bit is set. When the row is closed, the open bit is cleared.

Still referring to FIG. 1, the SDRAM controller also maintains programmable counters that monitor all of the functional AC timing parameters of the SDRAM and inform the state machine 13 of legal and illegal actions. If a new access is requested, but a different row than the desired one is open, these timers ensure that the minimum tRAS time is met before closing the row, and that the proper precharge time (tRP) is also met. These functions comprise a valuable part of the controller architecture, but are not necessarily associated directly with the row caching function.

Referring now to FIG. 2, a table depicting the memory configuration of an SDRAM device in accordance with the present invention is shown. In this embodiment, a circular buffer is implemented so that 64 lines of interest of the image are present at a time. The device storing the image data to memory would replace the first line of the image with the 65$^{th}$ line of the image when appropriate, and so on, in a circular fashion.

Still referring to FIG. 2, only memory banks 0 and 1 are used, and each bank will make visible some portion of 32 different lines of the image. This embodiment has nine column addresses, allowing for 512 memory locations to be available in each row of the memory array. The 512 columns are divided by 16, allocating 32 column locations to each line. Since a line may require more space than 32 columns, each line stored in as many rows as necessary.

Still referring to FIG. 2, the embodiment of the present invention provides an environment wherein an image could be scanned or processed horizontally first and then vertically (as is often done), and wherein 16 lines of the image would always be visible and available in an open row. Further optimization is possible if memory banks 2 and 3 are dedicated to this image buffer and contention with other memory users is avoided.

Figure 3:
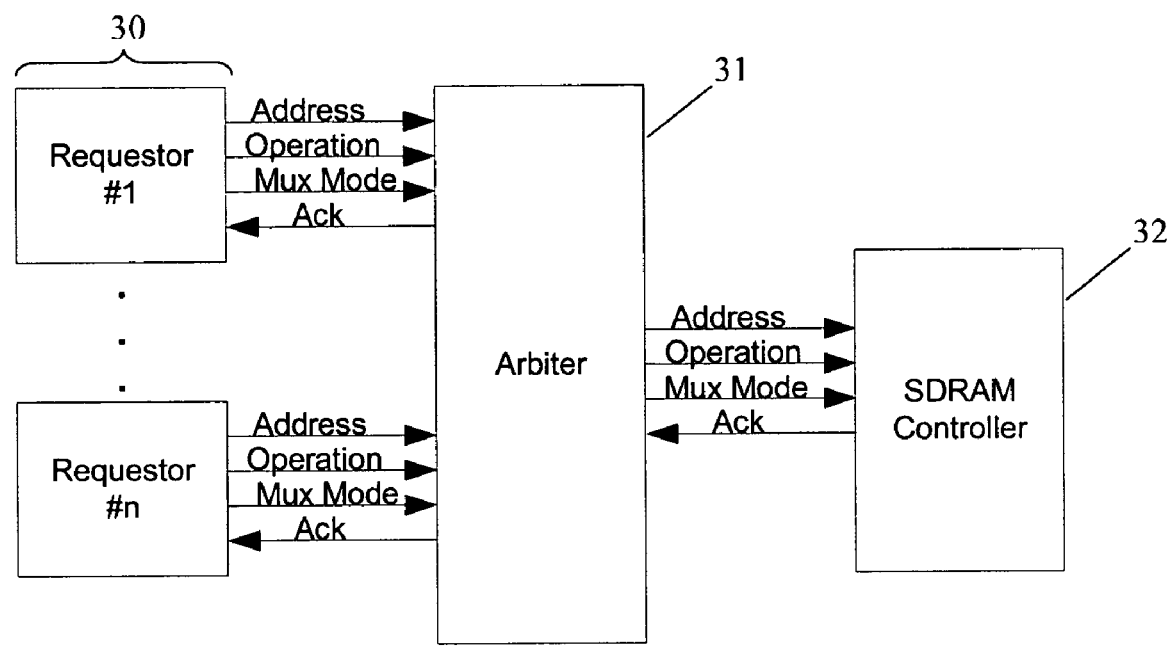
FIG. 3 is a block diagram illustrating a dynamic address multiplexing external structure in accordance with the present invention.

With reference to FIG. 3, a block diagram illustrating a dynamic address multiplexing external structure in accordance with the present invention is shown. Typically, a single address multiplexing scheme is adopted for a design and is enforced for all devices that access the memory. The typical scheme might be arranged so that page-mode operation is achievable (with a standard DRAM implementation) or that successive bursts to the same SDRAM row will yield successive pixels of the image.

Still referring to FIG. 3, data may be stored in different formats for many imaging environments. For example, 24-bit RGB color image data may be stored with all three planes stored together (RGBRGBR . . . ), or the image data may be stored in separate planes for easier access. The number of bits per pixel may also vary, with 8, 4, 2 or 1-bit versions of an image being stored at various stages during the processing. Since different objects in memory may be of different formats (bits per pixel) and widths, and since storing the objects on $2^n$ boundaries expedites memory access and facilitates address generation, it is desirable to allow different address multiplexing schemes in the same memory. The requesting devices 30 are capable of indicating to the SDRAM controller 32 the memory format desired, and SDRAM controller 32 acts accordingly. Using this method, one of the requesters 30 can be assured of efficient access to 8 contiguous lines of the image at 24 bits per pixel, while another can be assured of simultaneous access to 32 lines of the binary version of the image for rotation purposes.

Still referring to FIG. 3, while it is typical for an arbiter 31 to present addresses and commands from various requesters 30 to SDRAM controller 32, it is novel and necessary that the external structure provide a mechanism to dictate a particular multiplexing mode ("Mux Mode") to SDRAM controller 32. This is a simple extension of the arbiter 31.

Still referring to FIG. 3, it is also feasible that a multiplexor mode be assigned to various regions of memory, and that SDRAM controller 32 determine an addressing mode based upon an address decode. However, this approach is less flexible.

Still referring to FIG. 3, SDRAM controller 32 internally implements a multiplexor to select the proper row and column addresses' from the current address being accessed. This selection is controlled by the Mux Mode indication from the current requester 30 or arbiter 31.

With reference to FIGS. 4 and 5, complementary tables illustrating dynamic addresses multiplexing in accordance with the present invention are shown. The tables demonstrate how the address multiplexing is performed so different regions of memory can be optimized for different image types (based on the maximum width or "pitch," i.e. the memory allocated for each line of the image). Addresses are multiplexed differently based on the type of target SDRAM device and the number of row and column addresses used by the SDRAM device.

Still referring to FIGS. 4 and 5, the memory bank is a SODIMM module with a data bus width of 64 bits (or 8 bytes) The addresses are named as byte addresses, and the lowest order of the address bus used for connection to the memory multiplexing logic is A3, allowing addresses A2 through A0 to reference the eight bytes within a given 64-bit (8 byte) memory word.

Still referring to FIGS. 4 and 5, each memory requester 30 provides to the SDRAM controller 32 a desired pitch to be used when accessing the memory, and the multiplexing hardware uses the tables to determine how the multiplexing is performed. In addition, some pitch values also imply that a different number of scanlines be visible in a row at a given time. In this example, images with smaller pitch represent binary images. To optimize these images for rotation, and assuming that the rotation is based on a 32×32 hardware assist array, there will be 32 lines visible per open row at a given time (on 32 lines boundaries).

With reference to FIG. 5, the highest address used in the various schemes is A18. Since these are byte addresses, it implies that there be a particular scheme for this ½ MB block of memory. This also dictates that different multiplexing schemes must not exist in the same ½ MB region of memory lest conflict occur. In addition, this may then imply that the smallest block of memory allocated to a particular function be ½ MB simply to avoid risks of sharing such a small area and having different users access it with different multiplexing schemes. These restrictions are minimal given the size of SDRAM memories today and the resolution of most imaging applications.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for efficient access to multiple lines of image data using a memory device with at least one memory module, wherein each memory module has at least one bank with multiple rows, the method comprising the steps of:
   maintaining address information of a current row for each bank within each memory module;
   receiving a request for an incoming row;
   determining if the incoming row matches the current row based on the address information and if so, immediately accessing the current row without closing and reopening the current row;
   receiving a request for a desired memory format from an external structure; and
   selecting the desired memory format from different address multiplexing schemes.

2. The method according to claim 1 wherein the step of maintaining address information comprises the steps of:
   setting an open bit when the current row is opened; and
   clearing the open bit when the current row is closed.

3. The method according to claim 1 further comprising the step of maintaining programmable counters to monitor timing parameters and detect legal and illegal actions.

4. The method according to claim 1 further comprising the step of positioning adjacent lines of the image data in separate memory banks to optimize access to multiple lines of the image data.

5. The method according to claim 1 wherein the memory modules are SDRAM modules, each having four banks.

6. A memory controller for efficient access to multiple lines of image data using at least one memory module, wherein each memory module has at least one bank with multiple rows, the memory controller comprising:
   means for maintaining address information of a current row for each bank within each memory module;
   means for receiving a request for an incoming row; and
   means for determining if the incoming row matches the current row based on the address information and if so, immediately accessing the current row without closing and reopening the current row;
   means for receiving a request for a desired memory format from an external structure; and
   means for selecting the desired memory format from different address multiplexing schemes.

7. The memory controller according to claim 6 wherein the means for maintaining address information comprises:
   means for setting an open bit when the current row is opened; and
   means for clearing the open bit when the current row is closed.

8. The memory controller according to claim 6 further comprising programmable counters maintained to monitor timing parameters and detect legal and illegal actions.

9. The memory controller according to claim 6 wherein adjacent lines of the image data are positioned in separate memory banks to optimize access to multiple lines of the image data.

10. The memory controller according to claim 6 wherein the memory modules are SDRAM modules, each having four banks.

* * * * *